(12) United States Patent
Cavazos Sepulveda

(10) Patent No.: US 11,883,783 B2
(45) Date of Patent: Jan. 30, 2024

(54) SYSTEM AND METHOD FOR ELECTROCHEMICAL TREATMENT OF AQUEOUS FLUID FOR OILFIELD APPLICATIONS

(71) Applicant: SAUDI ARABIAN OIL COMPANY, Dhahran (SA)

(72) Inventor: Adrian Cesar Cavazos Sepulveda, San Pedro Garza Garcia (MX)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 268 days.

(21) Appl. No.: 17/186,761

(22) Filed: Feb. 26, 2021

(65) Prior Publication Data

US 2022/0274065 A1     Sep. 1, 2022

(51) Int. Cl.
*C02F 1/469*     (2023.01)
*E21B 43/16*     (2006.01)
(Continued)

(52) U.S. Cl.
CPC ............ *B01D 61/46* (2013.01); *C02F 1/4693* (2013.01); *E21B 43/16* (2013.01); *E21B 43/34* (2013.01);
(Continued)

(58) Field of Classification Search
CPC ....... B01D 61/46; C02F 1/4693; E21B 43/16; E21B 41/0092; E21B 43/34; E21B 43/35
See application file for complete search history.

(56) References Cited

U.S. PATENT DOCUMENTS

| 4,466,484 A | 8/1984 | Kermabon |
| 5,308,466 A | 5/1994 | Ganzi et al. |

(Continued)

FOREIGN PATENT DOCUMENTS

| CA | 2464669 C | 4/2010 |
| CA | 2662295 C | 2/2014 |

(Continued)

OTHER PUBLICATIONS

Alkhadra, Mohammad A. et al., "Small-scale desalination of seawater by shock electrodialysis", Desalination, ScienceDirect, Elsevier B.V., vol. 476, No. 114219, 2020, pp. 1-8 (8 pages).

(Continued)

*Primary Examiner* — Catherine Loikith
(74) *Attorney, Agent, or Firm* — Osha Bergman Watanabe & Burton LLP

(57) ABSTRACT

A method of electrochemically treating a hydrocarbon-bearing formation is provided. The method includes electrochemically treating an aqueous fluid to provide a first fluid having a first electrochemical potential and a second fluid having a second electrochemical potential. The first electrochemical potential the second electrochemical potential have opposite signs. The method then includes introducing an amount of the first fluid into the hydrocarbon bearing formation, and then an amount of a spacer fluid is introduced into the hydrocarbon-bearing formation. An amount of the second fluid may be optionally introduced into the formation. The steps of introducing the fluids are repeated until an end point is reached. A system for electrochemically a hydrocarbon-bearing formation is also provided.

6 Claims, 4 Drawing Sheets

(51) Int. Cl.
*E21B 43/34* (2006.01)
*B01D 61/46* (2006.01)
*E21B 43/38* (2006.01)
*C02F 103/10* (2006.01)

(52) U.S. Cl.
CPC .......... *E21B 43/38* (2013.01); *B01D 2313/50* (2013.01); *C02F 2103/10* (2013.01)

(56) References Cited

U.S. PATENT DOCUMENTS

| | | |
|---|---|---|
| 5,503,632 A | 4/1996 | Haak |
| 6,309,532 B1 | 10/2001 | Tran et al. |
| 7,594,996 B2 | 9/2009 | Colic |
| 8,157,981 B2 * | 4/2012 | Peters .................... E21B 43/28 204/263 |
| 8,333,883 B2 | 12/2012 | Peters et al. |
| 8,801,910 B2 | 8/2014 | Bazant et al. |
| 8,999,132 B2 | 4/2015 | Bazant et al. |
| 9,435,192 B2 * | 9/2016 | Lawrence ............... E21B 49/08 |
| 9,896,918 B2 * | 2/2018 | Munisteri ............... E21B 43/40 |
| 10,189,726 B2 | 1/2019 | Fu et al. |
| 10,458,220 B2 * | 10/2019 | Switzer ................... C09K 8/80 |
| 2003/0056805 A1 | 3/2003 | Sumita |
| 2005/0199387 A1 | 9/2005 | Wittle et al. |
| 2007/0187262 A1 | 8/2007 | Field et al. |
| 2012/0125605 A1 | 5/2012 | Willingham et al. |
| 2015/0096891 A1 | 4/2015 | Sparrow et al. |
| 2019/0169969 A1 * | 6/2019 | Al-Mulhem ............. C25B 1/04 |

FOREIGN PATENT DOCUMENTS

| | | |
|---|---|---|
| EP | 2396383 A1 | 12/2011 |
| EP | 3013760 B1 | 11/2018 |
| WO | 2013098193 A1 | 7/2013 |

OTHER PUBLICATIONS

Faverjon, F. et al., "Regeneration of hydrochloric acid and sodium hydroxide from purified sodium chloride by membrane electrolysis using a hydrogen diffusion anode-membrane assembly", Journal of Membrane Science, ScienceDirect, Elsevier B.V., vol. 284, Aug. 2006, pp. 323-330 (8 pages).

Kim, Sung Jae et al., "Direct Seawater Desalination by Ion Concentration Polarization", Nature Nanotechnology, Macmillan Publishers Limited, 2010, pp. 1-10 (11 pages).

Luo, Zhi-Xiang et al., "Electroneutrality breakdown and specific ion effects in nanoconfined aqueous electrolytes observed by NMR", Nature Communications, Macmillan Publishers Limited, Feb. 2015, pp. 1-8 (8 pages).

Marinova, K. G. et al., "Charging of Oil-Water Interfaces Due to Spontaneous Absorption of Hydroxyl Ions", Langmuir, American Chemical Society, vol. 12, No. 8, 1996, pp. 2045-2051 (7 pages).

Monroe, Charles W. and Charles Delacourt, "Continuum transport laws for locally non-neutral concentrated electrolytes", Electrochimica Acta, ScienceDirect, Elsevier Ltd., vol. 114, Oct. 2013, pp. 649-657 (9 pages).

* cited by examiner

SYSTEM AND METHOD FOR ELECTROCHEMICAL TREATMENT OF AQUEOUS FLUID FOR OILFIELD APPLICATIONS

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from an oil well. In enhanced oil recovery, a fluid is typically introduced through an injection well that is in fluid communication with the underground hydrocarbon reservoir in order to re-pressurize the reservoir and displace oil toward the surface. Some examples of these techniques include water flooding, chemical flooding, and supercritical $CO_2$ injections. These techniques require the use of significant amounts of water and/or other chemical constituents in order to effectively recover oil from subterranean formations. They also may suffer from inefficient oil recovery due to oil being dispersed in water phases, making separation and recovery from a well challenging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of electrochemically treating a hydrocarbon-bearing formation. The method includes electrochemically treating an aqueous fluid to provide a first fluid having a first electrochemical potential and a second fluid having a second electrochemical potential. The first electrochemical potential the second electrochemical potential have opposite signs. The method then includes introducing an amount of the first fluid into the hydrocarbon bearing formation. The method then includes altering the electrochemical potential of the hydrocarbon-bearing formation by contacting surfaces of the hydrocarbon-bearing formation with the first fluid. Then an amount of a spacer fluid is introduced into the hydrocarbon-bearing formation. The steps are repeated until an end point is reached.

In another aspect, embodiments disclosed herein relate to another method of electrochemically treating a hydrocarbon-bearing formation. The method includes electrochemically treating an aqueous fluid to provide a first fluid having a first electrochemical potential and a second fluid having a second electrochemical potential. The first electrochemical potential the second electrochemical potential have opposite signs. The method then includes introducing an amount of the first fluid into the hydrocarbon bearing formation followed by introducing an amount of the second fluid into the hydrocarbon-bearing formation. The steps are repeated until an end point is reached.

In yet another aspect, embodiments disclosed herein relate to a system for electrochemically treating a hydrocarbon-bearing formation. The system includes an electrochemical cell having a first electrode, a second electrode, and at least one ion exchange membrane disposed between the first electrode and the second electrode. The system further includes at least one treatment fluid conduit that is configured to convey a charged effluent from the electrochemical cell directly or indirectly to the hydrocarbon-bearing formation. The system also includes a mud system for providing a spacer fluid to the hydrocarbon-bearing formation and a flow control system configured to alternate injection of the charged effluent and the spacer fluid into the hydrocarbon-bearing formation.

Other aspects and advantages of the claimed subject matter will be apparent from the following description and the appended claims.

DETAILED DESCRIPTION

Embodiments disclosed herein generally relate to using electrochemical methods to produce fluids useful for enhanced oil recovery. Electrochemical methods may be utilized to generate charged fluids. Specifically, an electrochemical cell may be used to oxidize (i.e., positively charge) or reduce (i.e., negatively charge) a fluid. Similarly, electrochemical methods may be used to separate ionic species having different charges. An electrochemical cell typically has a positive electrode and a negative electrode separated by a separator. Electrochemical cells may be designed to separate particular ionic species of interest, which may be advantageous for use in enhanced oil recovery applications. Fluids having either a positive or negative electrochemical potential may be useful for modifying the electrical double layer of rocks and clay in formations, releasing oil from formation surfaces and enabling increased oil recovery.

Figure 1:
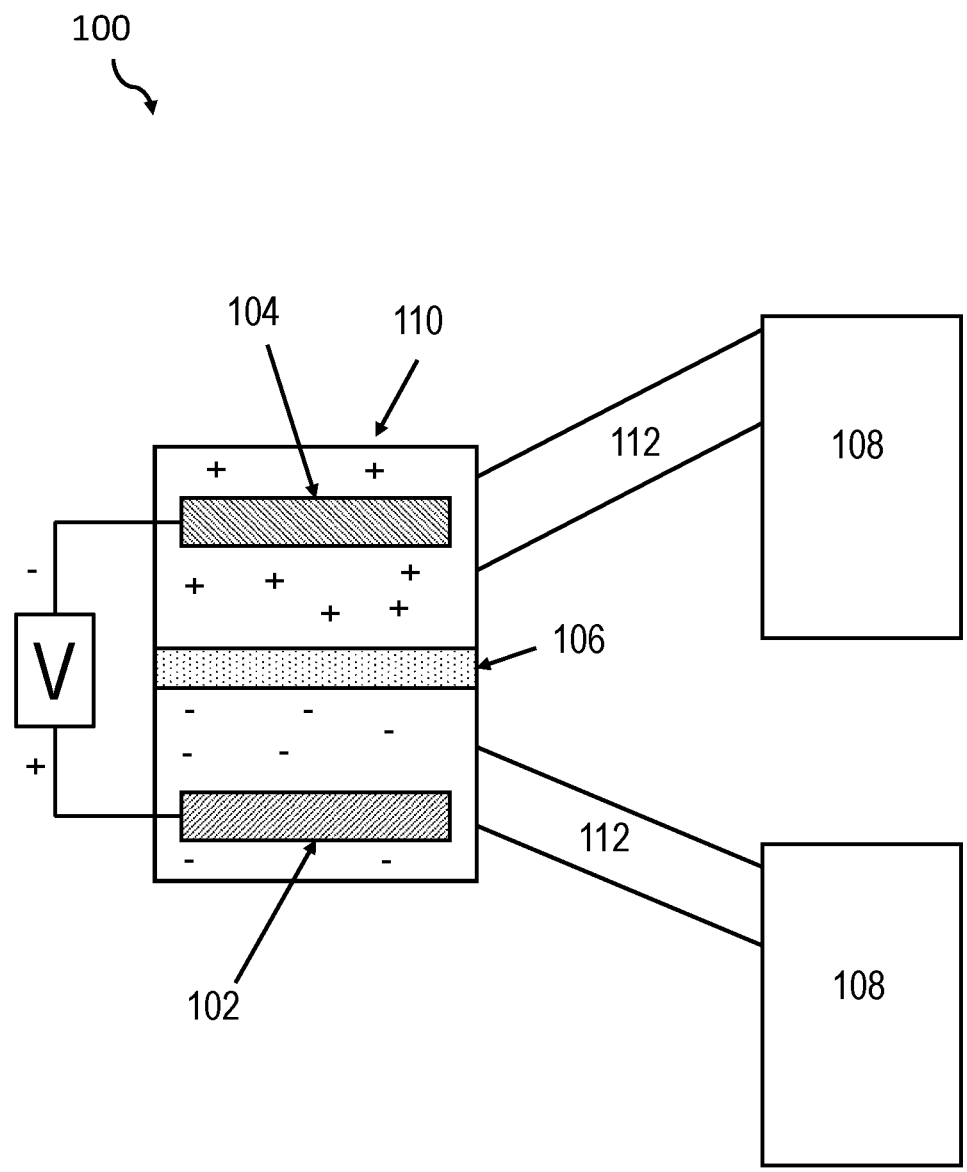
FIG. 1 is a simplified schematic of an electrochemical system in accordance with one or more embodiments of the present disclosure.

In one aspect, embodiments disclosed herein relate to a system for electrochemically treating a hydrocarbon bearing formation. An exemplary system is shown in FIG. 1. The system 100 may include an electrochemical cell 110 including a first electrode 102, a second electrode 104 and at least one at least one ion exchange membrane 106 disposed between the first electrode 102 and the second electrode 104. The system may include at least one treatment fluid conduit that is configured to convey a charged effluent from the electrochemical cell directly or indirectly to the hydrocarbon-bearing formation. In the embodiment shown in FIG. 1, the system includes two treatment fluid conduits 112. The system may include at least one storage tank 108 in fluid communication with the electrochemical cell via the treatment fluid conduits 112. In the embodiment shown in FIG. 1, the system includes two storage tanks 108.

In some embodiments, the system may not include a storage tank(s), and in such embodiments, charged effluent may be transferred directly or indirectly from the electrochemical cell 110 to a hydrocarbon bearing formation without the use of an intermediate storage tank. The system 100 may also include a mud system (not shown) for providing a spacer fluid to a hydrocarbon-bearing formation. The system may also include a flow control system (not shown) configured to alternate injection of the charged effluent and the spacer fluid into the hydrocarbon-bearing formation.

The electrodes and the ion exchange membrane(s) may facilitate the separation of charged species so that a positively charged fluid having cations (also referred to as a positively charged effluent) may be separated from a negatively charged fluid having anions (also referred to as a negatively charged effluent). In the embodiment shown in FIG. 1, the first electrode 102 is a positive electrode and the second electrode 104 is a negative electrode. Thus, the fluid on the side of the electrochemical cell having the first electrode 102 is negatively charged (shown by − symbols), and the fluid on the side of the electrochemical cell having the second electrode 104 is positively charged (shown by + symbols).

The ion exchange membrane 106 is not particularly limited. Examples of ion exchange membranes include, but are not limited to, a cation exchange membrane, an anion exchange membrane, a bipolar exchange membrane, and combinations thereof. In particular embodiments, the electrochemical cell may include an anion exchange membrane, a bipolar exchange membrane and a cation exchange membrane in between the positive and negative electrodes. In one or more embodiments, the ion exchange membrane may be a nanostructured ion exchange membrane. In such embodiments, the nanostructured ion exchange membrane may be selected from the group consisting of a molecular sieve, a metal-organic-framework, a carbon nanotube, graphene and combinations thereof. Examples of materials that may be used as ion exchange membranes include, but are not limited to, Nafion™ (e.g., from Dupont), Aquivon® (e.g., from Solvay), PEEK (poly ether ether ketone, e.g., from Victrex PLC/Novamem), and PBI (polybenzimidazole, e.g., from PBI Performance Products).

In some embodiments, the surface of an ion exchange membrane may be modified, such as by chemical or physical modifications. In some embodiments, modification may include functionalizing the surface of the ion exchange membrane with functional groups, such as sulfonated groups. Sulfonated groups or other useful functional groups known in the art may increase the ionic conductivity of the ion exchange membrane, improving performance and/or selectivity of the membrane. In some embodiments, modification may include depositing a thin layer of a metal on the surface of the ion exchange membrane. In some embodiments, the metal may be a noble metal such as gold or platinum, however, other metals, such as titanium, may also be utilized. Applying a thin layer of metal to the surface of the ion exchange membrane may increase the electrical conductivity of the ion exchange membrane. When an ion exchange membrane includes a layer of metal on the surface, an electrical potential may be applied to the ion exchange membrane to either enhance or reduce ionic transport. Surface modifications may induce a diffusivity selectivity. For example, electrostatic repulsion may slow down the extraction of divalent or polyvalent ions through the membrane, while monovalent ion extraction remains relatively unaffected.

Embodiment systems 100 may also include additional components (not shown) for producing electrochemically charged fluids. In such embodiments, the electrochemical cell 110 may include a component selected from the group consisting of a membrane, a frit, a mesh, a sieve, a wire, a bar, a plate, a fin, and combinations thereof. Such components may be electrically polarized in the electrochemical cell 110. Polarization may be achieved by placing the component between the first electrode 102 and the second electrode 104, and applying a potential across the two electrodes, or by putting the component in direct contact with either the first electrode of the second electrode.

Due to the selection of the ion exchange membrane(s), in one or more embodiments, the electrochemical cell is configured to selectively enhance a concentration of certain ionic species. In some embodiments, the electrochemical cell is configured to selectively enhance the concentration of divalent ions in the charged effluent.

In one or more embodiments, the treatment fluid conduit(s) 112 may be configured to convey charged effluent either directly or indirectly to a hydrocarbon formation. When a charged effluent is conveyed directly to a hydrocarbon-bearing formation, it is transferred from an electrochemical cell to a hydrocarbon-bearing formation without being stored in an intermediate storage tank. When a treatment fluid is conveyed indirectly to the hydrocarbon-bearing formation, it may be first transferred to at least one storage tank prior to being transferred to the hydrocarbon-bearing formation.

In one embodiment, the treatment fluid conduit 112 comprises a flow conduit configured to convey the negatively charged effluent directly or indirectly to the hydrocarbon-bearing formation. In another embodiment, the treatment fluid conduit 112 comprises a flow conduit configured to convey the positively charged effluent directly or indirectly to the hydrocarbon-bearing formation. In one embodiment, the treatment fluid conduit 112 comprises a first flow conduit configured to convey the negatively charged effluent directly or indirectly to the hydrocarbon-bearing formation and a second flow conduit configured to convey the negatively charged effluent directly or indirectly to the hydrocarbon-bearing formation.

As previously described, embodiment systems may optionally include at least one storage tank 108. Storage tanks 108 may be used to store aqueous fluids prior to electrochemical treatment or ionic fluids after electrochemical treatment. Embodiment systems may include an aqueous fluid storage tank for storing aqueous fluid prior to electrochemical treatment and a flow line for supplying an aqueous fluid to the electrochemical cell. In some embodiments, storage tanks may include temperature control for either heating or cooling fluids. Storage tanks may also include apparatuses for agitation or stirring of fluids. In some embodiments, aqueous fluids may be mixed with additives in the storage tanks prior to introduction into a hydrocarbon-bearing formation. In some embodiments, the system includes a storage tank for receiving a negatively charged effluent from the electrochemical cell and a corresponding pump for conveying the negatively charged effluent from the storage tank to the hydrocarbon-bearing formation. The system may also include a storage tank for receiving a positively charged effluent from the electrochemical cell and a pump for conveying the positively charged effluent from the storage tank to the hydrocarbon-bearing formation.

In some embodiments, the system includes a nanoparticle supply system. The nanoparticle supply system may include tanks, conduits, and pumps for supplying nanoparticles to the system. In one or more embodiments, the system includes a mixing tank. The mixing tank may be configured for receiving and mixing the charged effluent, nanoparticles, and other optional additives for producing a charged nanoparticle containing fluid.

In some embodiments, the system 100 may also include at least one pump. The pump may be used to introduce fluid from a storage tank into the electrochemical cell. In some embodiments, a pump may be in fluid communication with the hydrocarbon-bearing formation. In such embodiments, the pump may be used to introduce electrochemically treated fluid from the electrochemical cell or a storage tank into the hydrocarbon-bearing formation. The pump(s) may be used to introduce fluids having different electrochemical potentials into the hydrocarbon-bearing formation.

Embodiment systems may include a flow control system. In one or more embodiments, a flow control system may include piping, pumps, valves, and other equipment for transporting fluid. The flow control system may also include a digital control system for remotely controlling the piping, pumps and valves to in order to direct fluid flow as desired. In one or more embodiments, the flow control system is configured to sequentially inject a negatively charged effluent, a spacer fluid, and a positively charged effluent. In one or more embodiments, the flow control system is configured to sequentially inject either a positively charged effluent or a negatively charged effluent and a spacer fluid.

The system of FIG. 1 may be used, according to embodiments herein, to produce a first fluid (such as a positively charged fluid) and a second fluid (such as a negatively charged fluid). These fluids may be used to alter properties of a subterranean formation. In some embodiments, it may be desirable to inject a positively charged fluid into a hydrocarbon-bearing formation to influence or affect a property of the formation, such as to enhance oil production. In other embodiments, it may be desirable to inject a negatively charged fluid into a hydrocarbon-bearing formation to influence or affect a property of the formation, such as to enhance oil production. In yet other embodiments, it may be desired to inject both a positively charged fluid and a negatively charged fluid into a hydrocarbon-bearing formation to influence or affect properties of the formation, such as to enhance oil production. The injection of the respective fluids may be performed in various manners, including: a single injection of a desired volume of a positively or negatively charged fluid; multiple injections of a positively or negatively charged fluid, such as with a spacer fluid therebetween; or alternating injection(s) of a positively charged fluid and a negatively charged fluid, with or without a spacer fluid therebetween. Thus, the number and configuration of the tanks and pumps may depend upon the intended injection(s), as well as the needed volume of the injection(s) of the charged fluid(s).

Figure 2:
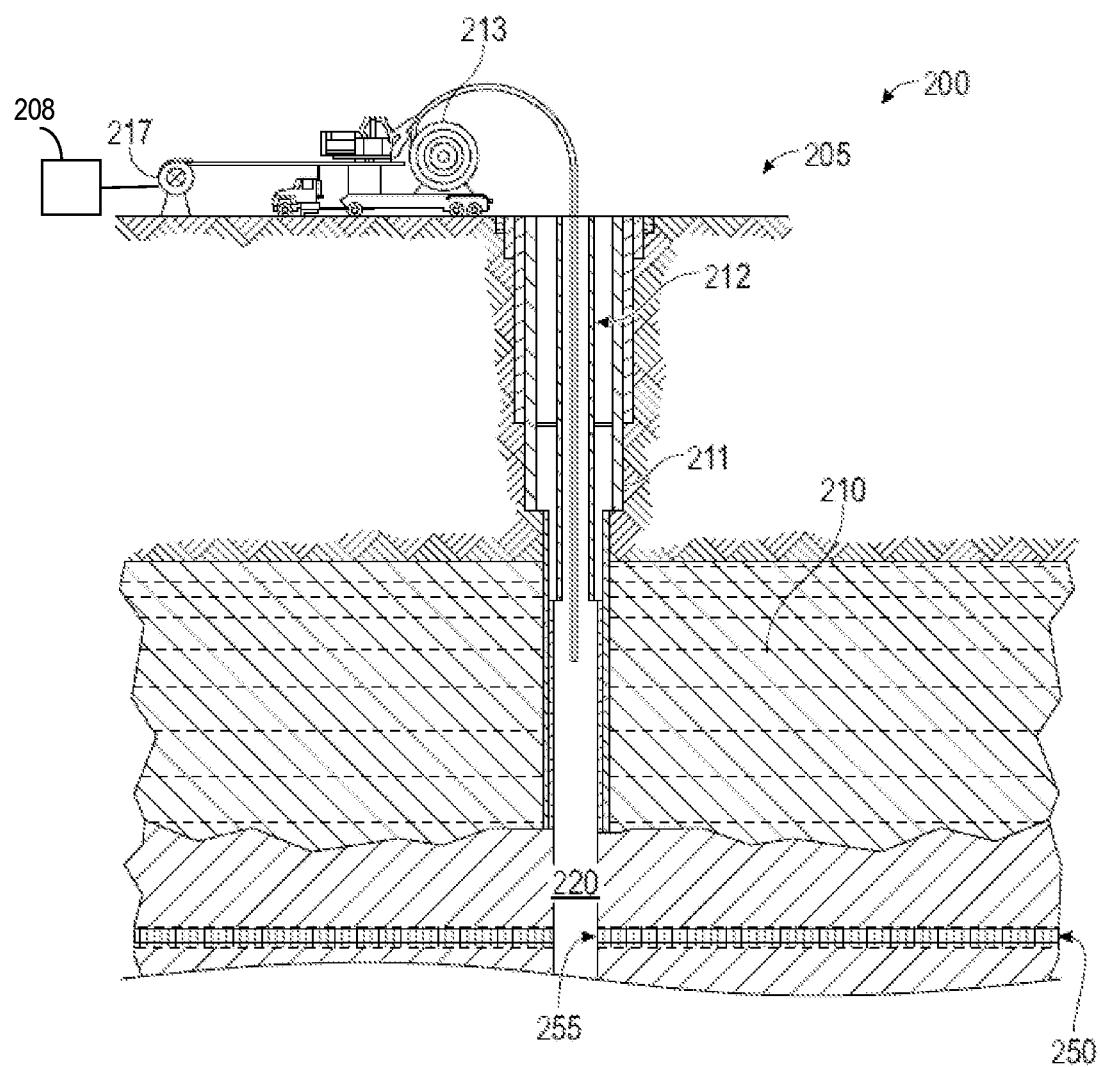
FIG. 2 is a simplified schematic of a well environment in accordance with one or more embodiments of the present disclosure.

FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The subsurface also includes target formation 250 to be treated. Target formation 250 has target formation face 255 that fluidly couples target formation 250 with wellbore 220 through wellbore wall 211. In this case, casing 212 and coiled tubing 213 extend downhole through the wellbore 220 into the subsurface 210 and towards target formation 250.

With the configuration shown in FIG. 2, the previously described electrochemically treated fluid may be introduced into the subsurface 210 and towards target formation 250 via a pump 217 through the coiled tubing 213. The pump 217 is in fluid communication with a storage tank 208. As previously described, the storage tank 208 may also be in fluid communication with the electrochemical cell (not shown). In embodiments where multiple fluids are injected, multiple pumps and tanks may be used to separately inject fluids.

Figure 3:
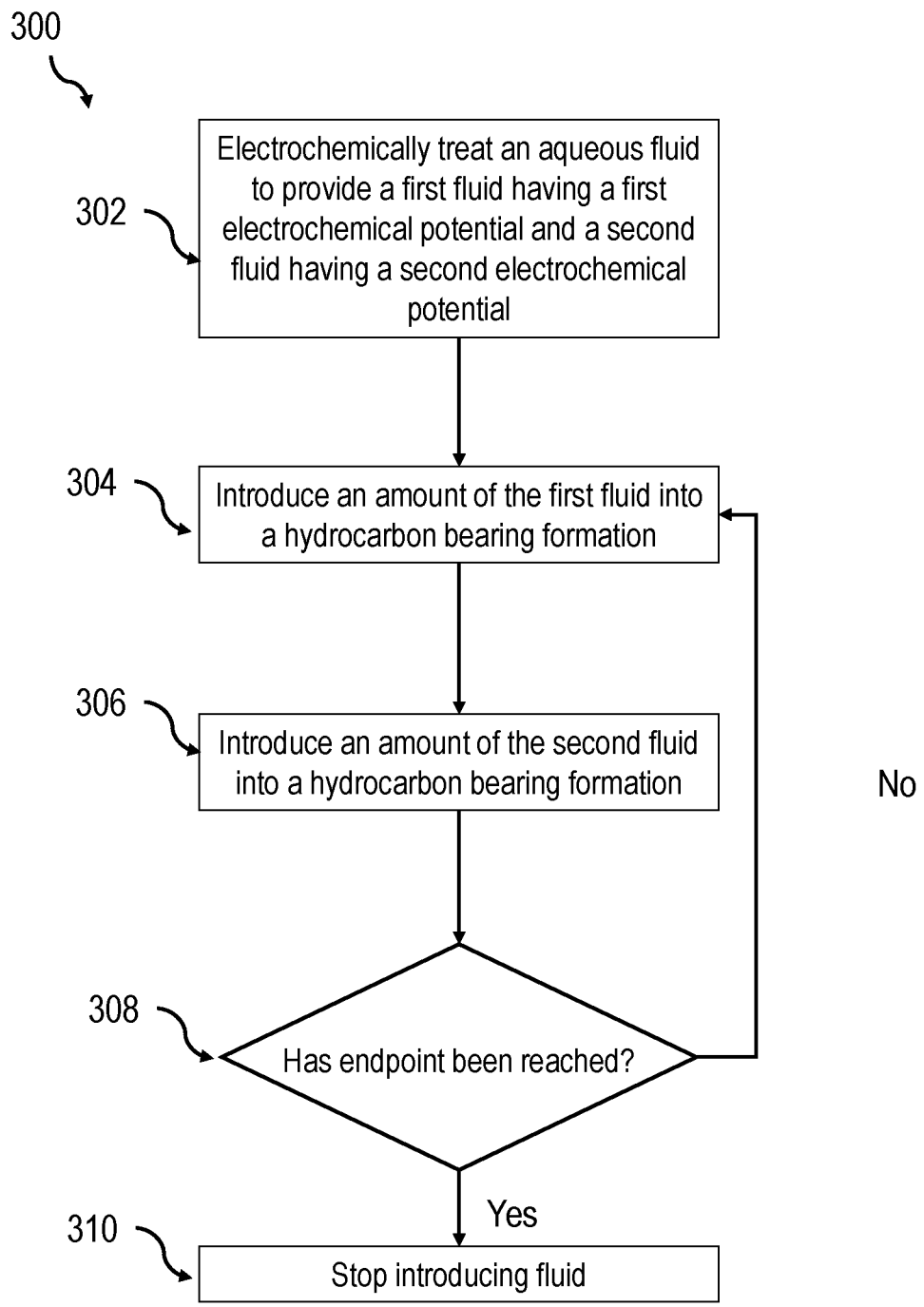
FIG. 3 is a block flow diagram of a method in accordance with one or more embodiments of the present disclosure.

In another aspect, embodiments disclosed herein relate to a method of treating a hydrocarbon-bearing formation. An exemplary method 300 is shown in FIG. 3. In the embodiment shown in FIG. 3, the method includes electrochemically treating an aqueous fluid to provide a first fluid having a first electrochemical potential and a second fluid having a second electrochemical potential 302. In such embodiments, the electrochemical potential of the first fluid and the electrochemical potential of the second fluid have opposite signs.

As can be appreciated by those skilled in the art, a desired composition of an injection fluid may be determined prior to electrochemically treating a fluid. The methods described herein may be used to produce a desired injection fluid that includes an electrochemically treated fluid.

In one or more embodiments, the aqueous fluid includes water. The water may comprise one or more known compositions of water, including distilled; condensed; filtered or unfiltered fresh surface or subterranean waters, such as: water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof.

The aqueous fluid may contain one or more salts that include but are not limited to sodium chloride (NaCl), calcium chloride ($CaCl_2$), magnesium chloride ($MgCl_2$), sodium sulfate ($Na_2SO_4$) calcium sulfate ($CaSO_4$) and magnesium sulfate ($MgSO_4$). Thus, embodiments of the disclosure may include aqueous solutions having a concentration of one or more ions that include but are not limited to sodium ions, sulfate ions, calcium ions, magnesium ions, and chloride ions. The aqueous fluid may contain other salts and ions, such as those containing bromine, fluorine, iodine, magnesium, calcium, sodium, potassium, strontium, vanadium, boron, uranium, and carbon-containing ions such as carbon dioxide and carbonates.

In one or more embodiments, the electrochemically treating step 302 includes applying a potential difference across two electrodes. In some embodiments, the electrochemically treating step 302 includes separating negatively charged ionic species and positively charged ionic species via an ion exchange membrane. The applied electrochemical potential may be selected based upon the composition of the aqueous fluid, the desired composition of the first fluid and the second fluid, and the type of ion exchange membranes used. In one or more embodiments, the applied electrochemical potential may have a range of from 0.1 to 1.2 V (volts). In some embodiments, the applied electrochemical potential may have a lower limit of one of 0.1, 0.2, 0.3, 0.4, 0.5 and 0.6 V and an upper limit of one of 0.7, 0.8, 0.9, 1.0, 1.1 and 1.2V, where any lower limit may be paired with any mathematically compatible upper limit. As a result of applying such an electrochemical potential, a first fluid and a second fluid having electrochemical potentials of opposite signs are produced.

The electrochemical potentials of the first and second fluids may be any suitable potentials, provided the first and second fluid have electrochemical potentials of opposite signs. In one or more embodiments, the electrochemical potential of the first fluid is negative. In such embodiments, the electrochemical potential of the first fluid may be from −0.01 to −1.23 V (volts). A negative electrochemical potential may be analogous to a fluid having a basic pH, thus, in some embodiments the first fluid may be a fluid having a basic pH.

In one or more embodiments, the electrochemical potential of the second fluid is positive. In such embodiments the electrochemical potential of the second fluid may be from 0.01 to 1.23V. A positive electrochemical potential may be analogous to a fluid having an acidic pH, thus, in some embodiments the second fluid may be a fluid having an acidic pH.

In some embodiments, the step of electrochemically treating an aqueous fluid 302 may include separating negatively charged ionic species and positively charged ionic species via at least one ion exchange membrane. The ion exchange membranes are as previously described. Certain ionic species may be particularly useful in treating hydrocarbon-bearing formations due to their utility in altering the wettability of surfaces within the formation, and perturbing the electrical double layer present in formations.

In some embodiments, the electrochemical potential of the first fluid is negative, and the first fluid contains negatively charged ionic species. In particular embodiments, it may be desirable to increase divalent anionic species, such as sulfate ions, and decrease monovalent anionic species, such as chloride ions. In one or more embodiments, the first fluid may contain a suitable amount of sulfate species for favorably altering the electrochemistry of the formation. In some embodiments, the first fluid comprises not greater than 10,000, 9,000, 8,000, 7,000 or 6,000, 4,000, 3,000, 2,000 or 1,000 ppm of sulfate ions. In some embodiments, the first fluid comprises not greater than 22,000, 20,000, 19,000, 18,000, 17,000, 16,000 and 15,000 ppm of chloride ions.

In some embodiments, the electrochemical potential of the second fluid is positive, and the second fluid contains positively charged ionic species. In particular embodiments, it may be desirable to increase divalent cationic species, such as magnesium and calcium ions, and decrease monovalent cationic species, such as sodium ions. In one or more embodiments, the second fluid may contain a suitable amount of magnesium and calcium species for favorably altering the electrochemistry of the formation. In some embodiments, the first fluid comprises not greater than 3,000, 2,500, 2,000, or 1,500 ppm of magnesium and calcium ions. In some embodiments, the first fluid comprises not greater than 90,000, 80,000, 70,000, 50,000, 30,000, 22,000, 20,000, 19,000, 18,000, 17,000, 16,000 and 15,000 ppm of sodium ions.

In one or more embodiments, as a result of the electrochemically treating step 302, fluids having non-neutral pH values may be produced. Specifically, a fluid having a pH of less than 7 (i.e., an acidic fluid) or a fluid having a pH of greater than 7 (i.e., a basic fluid) may be produced. For example, in some embodiments, the electrochemical methods disclosed herein by separating ions of a saline water via membranes, as noted above, and treating the fluids, such as with porous metals, to result in hydrochloric acid and sodium hydroxide, for example. In some embodiments, a chlor-alkali process or a modified chlor-alkali process may be used to produce various acids and bases directly at the anode by using electrodes such as $Mn_{1-x}Mo_xO_{2+y}$ or $Ru_{1-x}Zn_xO_{2+y}$. Such may be especially useful when used with a bipolar membrane electrodialysis cell. Voltages used for generation of hydrochloric acid may be, for example, 1.2 to 2 Volts. Acidic fluid may be particularly useful for dissolving mud and skin damage within hydrocarbon-bearing formations.

Prior to their use as an injection fluid, electrochemically treated fluids described herein may be mixed with other additives useful for treating hydrocarbon-bearing formations in order to prepare an injection fluid. For example, the injection fluid of one or more embodiments of the present disclosure may contain additives to provide various characteristics and properties to the fluid. The injection fluid may contain one or more viscosifiers or suspending agents, weighting agents, proppants, corrosion inhibitors, soluble salts, biocides, fungicides, seepage loss control additives, bridging agents, deflocculants, lubricity additives, shale control additives, gas-forming additives (e.g., $CO_2$ and $N_2$), and other additives as desired.

Referring back to FIG. 3, the method may then include introducing an amount of the first fluid into a hydrocarbon bearing formation 304. The first fluid may include any suitable additives, as previously described. The amount of the first fluid injected may be any amount suitable for favorably altering the electrochemistry of the formation, and the amount may be based on a number of factors, including formation attributes (distance to production well, porosity, type of formation, and well production rates (tight/depleted wells versus a good producing formation having a high permeability), among other formation properties), as well as the number and location of injection wells relative to the production well(s), among other factors. For some formations, an injection of the first fluid, or an injection of a first fluid for use in an alternating injection sequence (acid-spacer-base or acid-spacer-acid), may be a small volume, such as 1 to 5 $m^3$ for a tight or depleted well, or a large volume, such as 2000 to 3000 $m^3$ for a high permeability well; volumes injected may be intermediate, greater than, or less than these amounts, depending upon the well properties, and formation altering objectives of the injections, as noted above.

In embodiments where only a first fluid is injected, a spacer fluid or other injection fluid may be used to "push" the first fluid through the formation toward the production well and to continue production operations. The injection fluid may be, for example, a typical injection fluid or brine used in secondary or enhanced oil recovery operations. The composition of the spacer fluid should be such that it does not chemically interact with or otherwise negate the purpose and effects of the first fluid. In embodiments where only the positively charged fluid, or only the negatively charged fluid is injected, the unused charged fluid may be discarded, incorporated into other drilling, workover, or treatment fluids used at the well site, or may be designated for other alternate uses at the well site or elsewhere.

In embodiments where it is desirable to inject both the first and second fluids, such as in an alternating sequence with a spacer fluid, the method may then include introducing an amount of the second fluid into a hydrocarbon bearing formation 306. The second fluid may include any suitable additives, as previously described. The amount of the second fluid injected may be any amount suitable for favorably altering the electrochemistry of the formation, and may be based upon the variables as previously noted (formation properties, objectives of the treatment, configuration of the wells, etc.).

Steps 304-306 may be repeated until an end point is reached 308 and fluid introduction stops 310. In some embodiments, the end point may be a minimum threshold of oil recovery. In other embodiments, the end point is breakthrough of the aqueous fluid at a surface of the hydrocarbon-bearing formation. For example, where only a single charged fluid is injected, breakthrough of the charged fluid may be observable. In other embodiments, such as where alternating injections are used, the charged species may interact subsurface, and breakthrough may not be readily observable, even with use of spacer fluids. In such embodiments, the end point may be based upon oil recovery thresholds or other production factors.

Alternating between injecting a negatively charged fluid and a positively charged fluid may increase oil recovery in formations due to changes in the electrochemistry of the formation. Such changes may alter the wettability of surfaces within the formation. For example, carbonate surfaces inside the reservoirs described herein are typically oil-wet, and as a result, oil adheres strongly to the surfaces within the formation, making extraction of that oil difficult. When injected into a reservoir, aqueous fluids containing the previously described ionic species alter the wettability of carbonate surfaces within the subterranean formation. The surface wettability changes from oil-wet to water-wet, allowing the oil to detach from the carbonate surface. Furthermore, altering injections between a positively charged fluid and a negatively charged fluid consistently perturbs the electric double layer at carbonate/brine and crude oil/brine interfaces, thereby releasing additional oil from the surface and increasing overall oil recovery.

Figure 4:
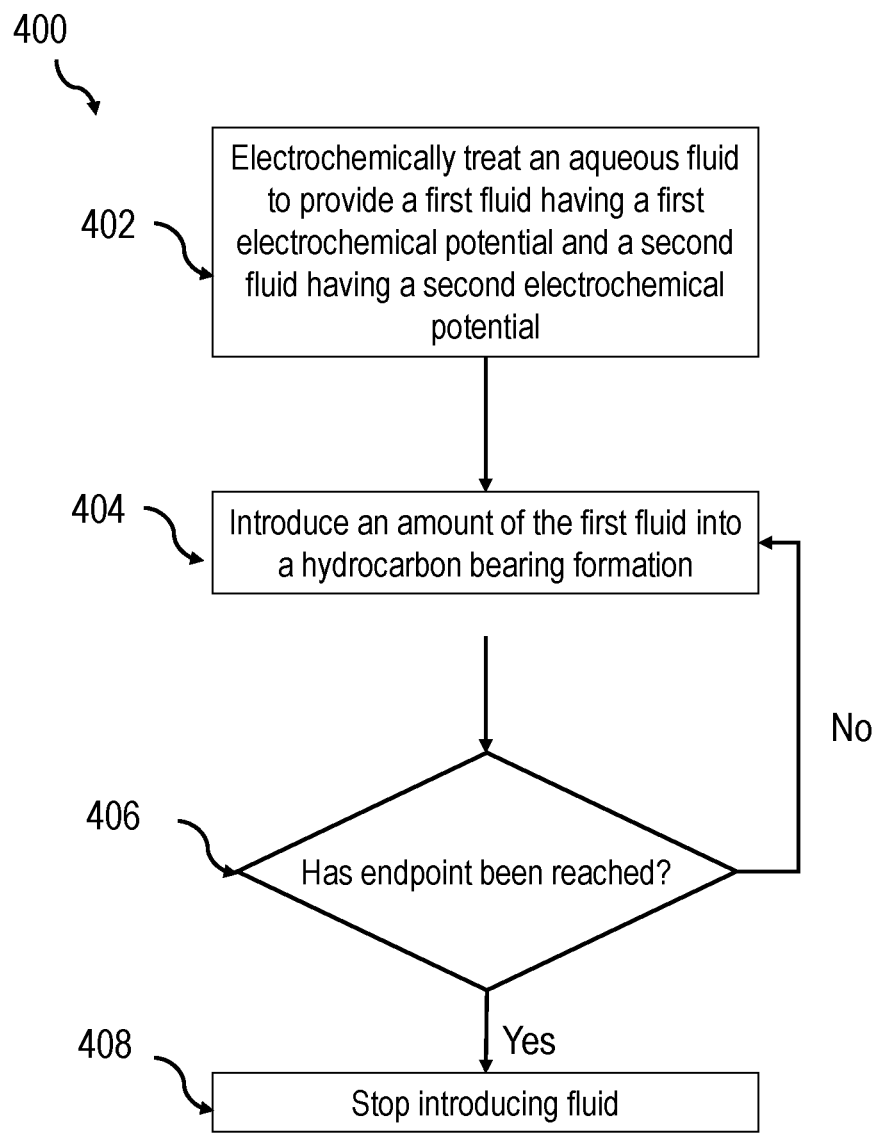
FIG. 4 is a block flow diagram of a method in accordance with one or more embodiments of the present disclosure.

In another aspect, embodiments disclosed herein relate to a method of electrochemically treating a hydrocarbon-bearing formation. An exemplary method is shown in FIG. 4. The exemplary method 400 includes electrochemically treating an aqueous fluid to provide a first fluid having a first electrochemical potential and a second fluid having a second electrochemical potential 402. In such embodiments, the first electrochemical potential the second electrochemical potential have opposite signs. The method then includes introducing an amount of the first fluid into a hydrocarbon bearing formation 404. After the fluid is introduced into the formation, the method includes altering the electrochemical potential of the hydrocarbon-bearing formation by contacting surfaces of the hydrocarbon-bearing formation with the first fluid. The steps of introducing an amount of the first fluid into a hydrocarbon bearing formation 404 and altering the electrochemical potential of the formation 408 may be repeated until an endpoint is reached 406, at which time no more fluid is introduced into the formation 408.

Prior to its use as an injection fluid, the first fluid may be mixed with other additives useful for treating hydrocarbon-bearing formations in order to prepare an injection fluid. For example, the injection fluid of one or more embodiments of the present disclosure may contain additives to provide various characteristics and properties to the fluid. The injection fluid may contain one or more viscosifiers or suspending agents, weighting agents, proppants, corrosion inhibitors, soluble salts, biocides, fungicides, seepage loss control additives, bridging agents, deflocculants, lubricity additives, shale control additives, and other additives as desired In some embodiments, the first fluid may have a negative electrochemical potential. In other embodiments, the first fluid may have a positive electrochemical potential. The potential range and composition of the first fluid may be achieved via electrochemical treatment and the presence of ionic species, as previously described. Due to the positive or negative electrochemical potential of the first fluid, the fluid alters the electrochemical potential of the hydrocarbon-bearing formation.

The first fluid alters the electrochemical potential of the hydrocarbon-bearing formation by contacting surfaces within the formation. Such surfaces may include rocks, clays, and sands, for example. As an example, clays may sorb cations and anions from solutions. Various other rocks and minerals may also include various sorbed, bound, or occluded ionic species. By flowing the positively or negatively charged fluids, or alternating flow of the positively and negatively charged fluids, through a formation according to embodiments herein, the charged fluids may react or interact with the ions contained within the clays, rocks, and minerals. The altered ionic nature of the formation may thus impact wettability of the surfaces of the formation, and hence the ability of a formation surface to retain hydrocarbons, allowing such hydrocarbons to flow toward the production well.

Systems and methods described herein may also be useful for enhancing the transport of nanoparticles within hydrocarbon-bearing formations. Some nanoparticles, such as those that display chemotaxis and pH-taxis, have the ability to utilize electrochemical gradients to move in fluids. For example, a nanoparticle displaying pH-taxis may more readily move from an area of high pH to low pH in a formation. As such, when electrochemical potentials of hydrocarbon-bearing formations can be tuned by the methods disclosed herein, nanoparticles may more easily travel to target areas of the formation. Examples of such nanoparticles include, but are not limited to Janus nanoparticles, bi-facial nanorods, charged polymers, ionic liquids and polymerized ionic liquids.

Methods disclosed herein may be used to generate electrochemical gradients in hydrocarbon-bearing formations. For example, if a fluid having a negative electrochemical potential is added to a formation, a negative electrochemical potential is generated in portions of the formation. Upon initial injection of the negatively charged fluid, an electrochemical gradient may be formed, meaning portions of the formation are more negatively charged than others. Nanoparticles may utilize such electrochemical gradients in order to travel to portions of the formation. As will be appreciated by those skilled in the art, electrochemical gradients may be generated using negatively charged fluids, positively charged fluids, and combinations thereof.

In the oil recovery processes disclosed herein, nanoparticles may be introduced into a hydrocarbon-bearing formation at any appropriate stage during the oil recovery process. In one or more embodiments, nanoparticles may be introduced prior to the injection of electrochemically treated fluid. In other embodiments, nanoparticles and electrochemically treated fluid may be introduced to the hydrocarbon-bearing formation simultaneously. In some embodiments, nanoparticles may be introduced into the hydrocarbon-bearing formation after the electrochemically treated fluids has been introduced. In some embodiments, nanoparticles may be present in the aqueous fluid prior to electrochemical treatment. In some embodiments, nanoparticles may be introduced into the negatively charged fluid, the positively charged fluid, or both. In one or more embodiments disclosed herein, nanoparticles may be delivered to target areas of the formation more readily by utilizing electrochemical gradients.

Embodiments of the present disclosure may provide at least one of the following advantages. The systems and methods disclosed herein may result in in higher oil recovery, increased oil production, lower water cut in production and faster oil recovery as compared to traditional methods.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of electrochemically treating a hydrocarbon-bearing formation, the method comprising:
   (a) electrochemically treating an aqueous fluid to provide a first fluid having a first electrochemical potential and a second fluid having a second electrochemical potential, wherein the first electrochemical potential the second electrochemical potential have opposite signs;
   (b) introducing an amount of the first fluid into the hydrocarbon bearing formation;
   (c) altering an electrochemical potential of the hydrocarbon-bearing formation by contacting surfaces of the hydrocarbon-bearing formation with the first fluid;
   (d) introducing an amount of a chemically inert spacer fluid into the hydrocarbon-bearing formation; and
   (e) repeating steps (b)-(d) until an end point is reached.

2. The method of claim 1, wherein the electrochemical potential of the first fluid is from −0.01 to −1.23 V.

3. The method of claim 1, wherein the electrochemical potential of the first fluid is from 0.01 to 1.23 V.

4. The method of claim 1, wherein the first fluid comprises negatively charged ionic species, and wherein the negatively charged ionic species comprise not greater than 10,000 ppm of sulfate ions and not greater than 20,000 ppm of chlorine ions.

5. The method of claim 1, wherein the first fluid comprises positively charged ionic species, and wherein the positively charged ionic species comprise not greater than 3,000 ppm of calcium and magnesium ions, and not greater than 90,000 ppm of sodium ions.

6. The method of claim 1 further comprising adding nanoparticles to the first fluid prior to introducing the amount of the first fluid into the hydrocarbon bearing formation.

* * * * *